(12) United States Patent
Wu et al.

(10) Patent No.: US 12,710,614 B2
(45) Date of Patent: Aug. 18, 2026

(54) DEVICE FOR MOUNTING OPTICAL ELEMENT AND SAMPLE PROCESSING INSTRUMENT

(71) Applicant: Beckman Coulter Biotechnology (Suzhou) Co., Ltd., Suzhou (CN)

(72) Inventors: Jingzhang Wu, Suzhou (CN); Wenlei Fang, Suzhou (CN); Jianhua Wang, Suzhou (CN)

(73) Assignee: Beckman Coulter Biotechnology (Suzhou) Co., Ltd., Suzhou (CN)

( * ) Notice: Subject to any disclaimer, the term of this patent is extended or adjusted under 35 U.S.C. 154(b) by 631 days.

(21) Appl. No.: 18/348,250

(22) Filed: Jul. 6, 2023

(65) Prior Publication Data

US 2024/0012220 A1 Jan. 11, 2024

(30) Foreign Application Priority Data

Jul. 7, 2022 (CN) ......................... 202210797101.0

(51) Int. Cl.
*G02B 7/02* (2021.01)
*G01N 15/1434* (2024.01)
*G02B 7/04* (2021.01)

(52) U.S. Cl.
CPC ......... *G02B 7/023* (2013.01); *G01N 15/1434* (2013.01); *G02B 7/021* (2013.01); *G02B 7/022* (2013.01); *G02B 7/026* (2013.01); *G02B 7/04* (2013.01); *G01N 2015/1452* (2013.01)

(58) Field of Classification Search
CPC ........ G02B 7/023; G02B 7/021; G02B 7/022; G02B 7/026; G02B 7/04; G02N 15/1434; G02N 15/1436; G02N 2015/1452
See application file for complete search history.

(56) References Cited

U.S. PATENT DOCUMENTS 6,650,488 B2 11/2003 Onda
7,087,877 B2 8/2006 Ortyn et al.
7,099,088 B2 8/2006 Okuda
7,126,763 B2 10/2006 Sasaki
(Continued)

FOREIGN PATENT DOCUMENTS

CA 3105817 A1 1/2020
CN 1992017 A 7/2007
(Continued)

*Primary Examiner* — Angela M. Medich
(74) *Attorney, Agent, or Firm* — Merchant & Gould P.C.

(57) ABSTRACT

The present disclosure relates to a device for mounting an optical element and a sample processing instrument including the device for mounting an optical element. The device for mounting the optical element includes: a frame; a mount fitted in the frame in a translatable but non-rotatable manner and having a mounting portion for accommodating the optical element; and an adjusting nut attached to the frame in a rotatable but non-translatable manner. The adjusting nut has a screw and a head located at an end of the screw for operation, and the mount has a threaded portion engaged threadedly with the screw, such that when the adjusting nut rotates, the mount translates relative to the frame. The device and the sample processing instrument according to the disclosure can allow adjustment of an optical element while preventing the latter from being off-center.

13 Claims, 6 Drawing Sheets

(56) References Cited

U.S. PATENT DOCUMENTS

| | | | |
|---|---|---|---|
| 7,446,960 B2 | 11/2008 | Morinaga | |
| 7,468,789 B2 | 12/2008 | Czarnek | |
| 7,746,581 B2 | 6/2010 | Lee et al. | |
| 7,819,532 B2 | 10/2010 | Iinuma et al. | |
| 7,825,362 B2 | 11/2010 | Hsu et al. | |
| 7,876,436 B2 | 1/2011 | Chu | |
| 7,968,832 B2 | 6/2011 | Okuda et al. | |
| 8,049,804 B2 | 11/2011 | Fujita | |
| 8,223,445 B2 | 7/2012 | Van Den Engh | |
| 8,432,541 B2 | 4/2013 | Rich | |
| 8,503,116 B2 | 8/2013 | Jang | |
| 8,619,370 B2 | 12/2013 | Hunter et al. | |
| 9,013,693 B2 | 4/2015 | Yamamoto et al. | |
| 9,029,803 B2 | 5/2015 | Kishima | |
| 9,557,521 B2 | 1/2017 | Nowak et al. | |
| 9,702,826 B2 | 7/2017 | Hashimoto et al. | |
| 9,709,769 B2 | 7/2017 | Rohani et al. | |
| 9,778,165 B2 | 10/2017 | Van Den Engh et al. | |
| 10,113,967 B2 | 10/2018 | Norton et al. | |
| 10,234,392 B2 | 3/2019 | Li et al. | |
| 10,267,722 B2 | 4/2019 | Rousseau | |
| 10,338,354 B2 | 7/2019 | Meng et al. | |
| 10,473,578 B2 | 11/2019 | Kaduchak et al. | |
| 10,663,700 B2 | 5/2020 | Winz et al. | |
| 10,739,245 B2 | 8/2020 | Vrane et al. | |
| 10,802,240 B2 | 10/2020 | Harada | |
| 10,876,947 B2 | 12/2020 | Weiss et al. | |
| 11,022,776 B2 | 6/2021 | Kaneko | |
| 11,035,776 B2 | 6/2021 | Dembski et al. | |
| 11,169,386 B2 | 11/2021 | Meng et al. | |
| 11,249,319 B2 | 2/2022 | Duncan et al. | |
| 11,262,284 B2 | 3/2022 | Matsuda et al. | |
| 11,262,288 B2 | 3/2022 | Heanue et al. | |
| 2006/0256335 A1 | 11/2006 | Chen | |
| 2007/0147195 A1 | 6/2007 | Morinaga | |
| 2008/0186490 A1 | 8/2008 | Chu | |
| 2009/0206234 A1 | 8/2009 | Okuda et al. | |
| 2011/0058163 A1 | 3/2011 | Rich | |
| 2015/0253533 A1* | 9/2015 | Nowak | G02B 7/028 250/222.1 |
| 2016/0146732 A1 | 5/2016 | Freitag et al. | |
| 2017/0010436 A1* | 1/2017 | Leitner | G02B 23/18 |
| 2017/0138856 A1 | 5/2017 | Li et al. | |
| 2018/0196278 A1 | 7/2018 | Duncan et al. | |
| 2019/0369373 A1 | 12/2019 | Volfson | |
| 2020/0033242 A1 | 1/2020 | Weiss et al. | |
| 2020/0072729 A1 | 3/2020 | Lumpkin et al. | |
| 2020/0132590 A1 | 4/2020 | Dembski et al. | |
| 2020/0240890 A1 | 7/2020 | Matsuda et al. | |
| 2020/0240896 A1 | 7/2020 | Karasikov et al. | |
| 2020/0341286 A1 | 10/2020 | Meng et al. | |
| 2021/0116668 A1* | 4/2021 | Nemoto | G01B 11/2518 |
| 2021/0271050 A1 | 9/2021 | Bodendorfer et al. | |

FOREIGN PATENT DOCUMENTS

| | | | |
|---|---|---|---|
| CN | 101236150 | A | 8/2008 |
| CN | 202995126 | U | 6/2013 |
| CN | 104568711 | A | 4/2015 |
| CN | 204439942 | U | 7/2015 |
| CN | 103246063 | B | 12/2015 |
| CN | 105345273 | A | 2/2016 |
| CN | 105408734 | A | 3/2016 |
| CN | 206200344 | U | 5/2017 |
| CN | 104914548 | B | 11/2017 |
| CN | 108120666 | A | 6/2018 |
| CN | 207488146 | U | 6/2018 |
| CN | 109708847 | A | 5/2019 |
| CN | 109739024 | A | 5/2019 |
| CN | 107329230 | B | 6/2019 |
| CN | 209182212 | U | 7/2019 |
| CN | 110208227 | A | 9/2019 |
| CN | 209459866 | U | 10/2019 |
| CN | 110779840 | A | 2/2020 |
| CN | 210046168 | U | 2/2020 |
| CN | 111381380 | A | 7/2020 |
| CN | 111398139 | A | 7/2020 |
| CN | 111474104 | A | 7/2020 |
| CN | 212514144 | U | 2/2021 |
| CN | 112470054 | A | 3/2021 |
| CN | 112601948 | A | 4/2021 |
| CN | 112805548 | A | 5/2021 |
| CN | 113238388 | A | 8/2021 |
| CN | 214041161 | U | 8/2021 |
| CN | 113811755 | A | 12/2021 |
| CN | 114137724 | A | 3/2022 |
| DE | 102013211885 | A1 | 12/2014 |
| DE | 102014204325 | B3 | 8/2015 |
| DE | 202015007130 | U1 | 3/2016 |
| DE | 102017218084 | A1 | 4/2019 |
| DE | 102018212685 | A1 | 1/2020 |
| EP | 2042853 | A1 | 4/2009 |
| EP | 3686573 | A2 | 7/2020 |
| JP | 2004077705 | A | 3/2004 |
| JP | 2007178909 | A | 7/2007 |
| JP | 2008524831 | A | 7/2008 |
| JP | 4911172 | B2 | 4/2012 |
| JP | 2020118549 | A | 8/2020 |
| JP | 6881475 | B2 | 6/2021 |
| JP | 2021530000 | A | 11/2021 |
| JP | 2021535999 | A | 12/2021 |
| KR | 20200092260 | A | 8/2020 |
| KR | 20210029781 | A | 3/2021 |
| KR | 20210050517 | A | 5/2021 |
| TW | 202028720 | A | 8/2020 |
| WO | 2008007725 | A1 | 1/2008 |
| WO | 2014206747 | A1 | 12/2014 |
| WO | 2017060105 | A1 | 4/2017 |
| WO | 2020013875 | A1 | 1/2020 |
| WO | 2020047457 | A1 | 3/2020 |
| WO | 2020091866 | | 5/2020 |
| WO | 2020219263 | A1 | 10/2020 |

* cited by examiner

DEVICE FOR MOUNTING OPTICAL ELEMENT AND SAMPLE PROCESSING INSTRUMENT

CROSS-REFERENCE TO RELATED APPLICATION(S)

This application claims priority to CN Application No. 202210797101.0, filed on Jul. 7, 2022, titled DEVICE FOR MOUNTING OPTICAL ELEMENT AND SAMPLE PROCESSING INSTRUMENT, the disclosure of which is hereby incorporated by reference in its entirety.

FIELD

The present disclosure relates to a device for mounting an optical element and a sample processing instrument including the device for mounting an optical element.

BACKGROUND

This section only provides background information related to the present disclosure, which is not necessarily the prior art.

Optical systems are widely used in various detection apparatuses. For example, laser systems are used in medical detection apparatuses to perform, e.g., flow cytometry analysis. In order to obtain accurate detection results, it may be necessary to adjust optical elements to change the characteristics, such as beam size or divergence angle, of a light beam.

In existing optical systems, thread structures are generally used to adjust optical elements (for example, lenses), for example, to adjust a distance between two optical elements. The first optical element of the two optical elements is fixed, and the second optical element rotates with the threaded structure so as to move closer or further away from the first optical element, thereby changing the characteristics of the light beam. During the threaded adjustment, the center of the optical element will deviate due to the tolerance between the center of the optical element and the center of the thread, so that the parameters, such as the exit angle or the position of the beam waist, of the light beam will be varied, and the collected signal will be varied accordingly, which will significantly affect the detection result.

SUMMARY

A general summary of the present disclosure is provided in this section, rather than the full scope of the present disclosure or a comprehensive disclosure of all features of the present disclosure.

In view of the above issues of existing optical systems, an object of the present disclosure is to provide a device for mounting an optical element which can adjust the optical element while preventing the optical element from being off-center.

Another object of the present disclosure is to provide a sample processing instrument including the device for mounting an optical element, for example a flow cytometer. In the sample processing instrument, the light emitted from a laser light source can be shaped by adjusting the optical element (for example, a lens or lens group) so that the shaped light beam has a desired size in a predetermined direction, thereby improving the detection performance.

A device for mounting an optical element is provided according to an aspect of the present disclosure. The device for mounting an optical element includes: a frame; a mount fitted in the frame in a translatable but non-rotatable manner and having a mounting portion for accommodating the optical element; and an adjusting nut attached to the frame in a rotatable but non-translatable manner. The adjusting nut has a screw and a head located at an end of the screw for operation, and the mount has a threaded portion engaged threadedly with the screw, such that when the adjusting nut rotates, the mount translates relative to the frame.

In the device for mounting an optical element according to the present disclosure, the mount and the optical element mounted on the mount only translate but not rotate when the adjusting nut rotates, so that the off-center of the optical element generated from rotation can be avoided or suppressed. Thus, it can be ensured that the characteristics of the light beam are stable and meet the requirements.

In some embodiments of the present disclosure, the frame has a V-shaped slot, and the mount has a V-shaped portion fitted in the V-shaped slot.

In some embodiments of the present disclosure, the threaded portion is a threaded hole with an internal thread, and the screw has an external thread engaged with the internal thread.

In some embodiments of the present disclosure, the mounting portion is located on a side of the V-shaped portion, and the threaded hole is provided in the V-shaped portion.

In some embodiments of the present disclosure, the device further includes a fixing plate and a retaining ring. The fixing plate is fixedly attached to the frame and has a hole for receiving the screw of the adjusting nut. The retaining ring is located on a side of the fixing plate opposite to the head of the adjusting nut and is configured to limit translation of the adjusting nut relative to the frame.

In some embodiments of the present disclosure, the fixing plate is fixed to the frame via a fastener.

In some embodiments of the present disclosure, the device further includes a locking device. The locking device is configured to apply a pre-pressure to the mount when the mount translates and to lock the mount relative to the frame when the mount is in place.

In some embodiments of the present disclosure, the locking device includes a threaded member and a biasing member located between the threaded member and the mount, and the threaded member is engaged with a threaded hole in the frame.

In some embodiments of the present disclosure, the threaded member has a tapered rounded tip, and the mount is provided with a recess for receiving the rounded tip, and the recess extending in a direction of translation of the mount.

In some embodiments of the present disclosure, the device includes two locking devices arranged symmetrically with respect to a plane passing through a central axis of the screw.

In some embodiments of the present disclosure, the head of the adjusting nut has operational features for a tool to operate.

In some embodiments of the present disclosure, the mounting portion includes a first stepped through hole, and the frame is provided with a second stepped through hole for accommodating another optical element. When the mount is fitted into the frame, a central axis of the first stepped through hole coincides with a central axis of the second stepped through hole, and the mount can translate along the central axis of the first stepped through hole.

A sample processing instrument is provided according to another aspect of the present disclosure. The sample processing instrument includes the above-mentioned device for mounting an optical element. The optical element is a lens or lens group for adjusting a light source for optical detection or analysis.

The above and other objects, features and advantages of the present disclosure will be more fully understood from the detailed description given below and the accompanying drawings, which are given by way of illustration only and therefore, are not considered to limit the present disclosure.

BRIEF DESCRIPTION OF THE DRAWINGS

The features and advantages of one or more embodiments of the present disclosure will become more readily understood from the following description with reference to the accompanying drawings. In the drawings.

DETAILED DESCRIPTION OF THE EMBODIMENTS

Figure 1:
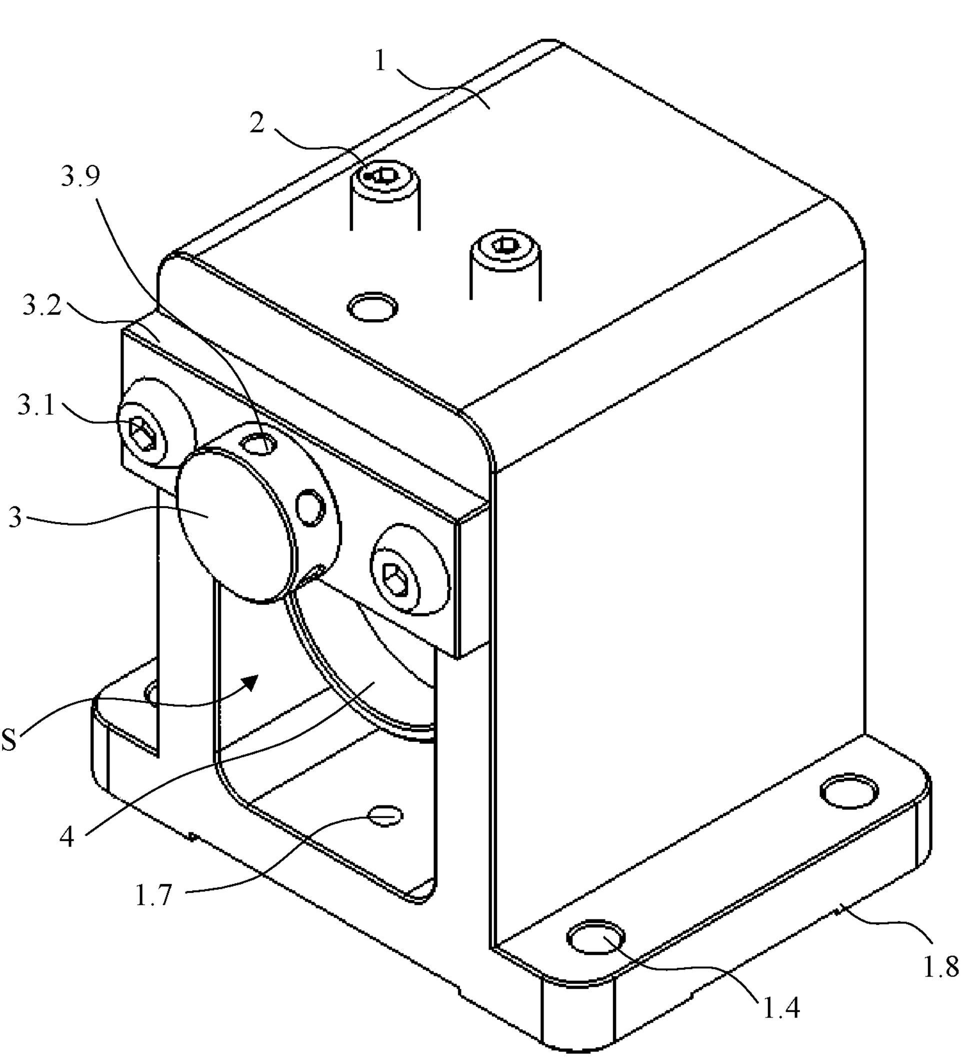
FIG. 1 is a schematic perspective view of a device for mounting an optical element according to an embodiment of the present disclosure.

The following detailed description of the present disclosure is for explanation only and is by no means intended to limit the present disclosure and the applications or usages thereof. The implementations described in this specification are not exhaustive and are merely some of many possible implementations. Exemplary embodiments may be embodied in many different forms and should not be construed as limitation to the scope of the present disclosure. In some exemplary embodiments, well-known processes, well-known device structures, and well-known technologies may not be described in detail.

The device according to the present disclosure is adapted to mount various optical elements to be adjusted. For example, the device may be adapted to mount a lens or lens group, and can allow the lens or lens group to translate to change the distance between the lens or lens group relative to other optical elements. For example, the device is adapted to mount a lens or lens group for beam expander. By adjusting the optical element in the device, the spot size, divergence angle, beam waist position, etc. of the light beam can be changed.

The device according to the present disclosure can be applied to various optical detection devices or instruments. For example, the device according to the present disclosure may be applied to a sample processing instrument for detecting or sorting liquid samples containing biological particles (for example, extracellular vesicles) or non-biological particles (for example, beads).

The device for mounting an optical element according to the present disclosure will be described below with reference to the accompanying drawings. In several drawings, similar reference numerals refer to similar parts and components.

FIGS. 1 to 5 show various views of a device 10 for mounting an optical element according to an embodiment of the present disclosure. Referring to FIGS. 1 to 5, the device 10 includes a fixed frame 1, a mount 4 mounted with an optical element and capable of translating relative to the frame 1, and an adjusting nut 3 for driving the mount 4 to translate.

The frame 1 may be fixed to an optical detection device or instrument to which the device 10 is applied. For example, the frame 1 may be fixed to the optical detection device or instrument by fasteners (not shown) such as screws or bolts. In this case, the frame 1 is provided with holes 1.4 for receiving fasteners. The frame 1 generally has a shape of a rectangular parallelepiped. A bottom surface 1.8 of the frame 1 is used as a mounting surface, and the holes 1.4 are provided at four corners of the bottom of the frame 1. It will be appreciated that the configuration of the holes 1.4 (including size, shape and number, etc.) may vary as desired. It will be appreciated that the frame 1 may also be fixed to the optical detection device or instrument by any other suitable known means.

Figure 3:
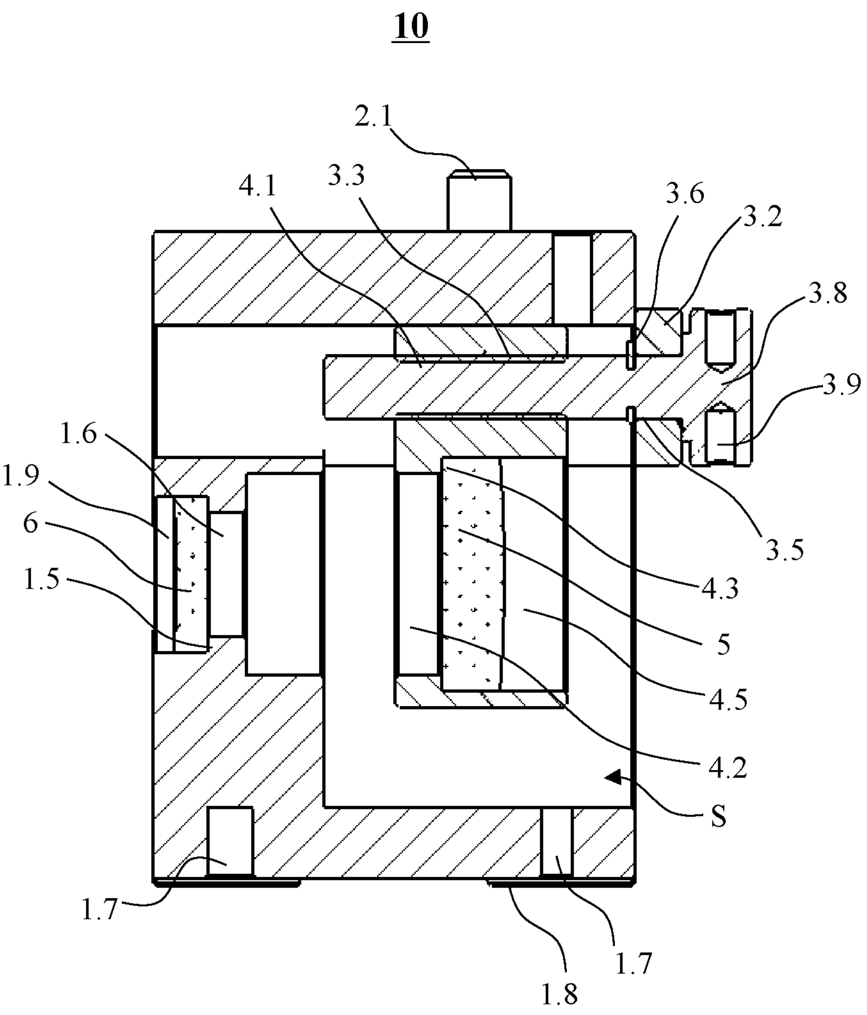
FIG. 3 is a schematic cross-sectional view of the device in FIG. 1, cut in the front-rear direction.
Figure 4:
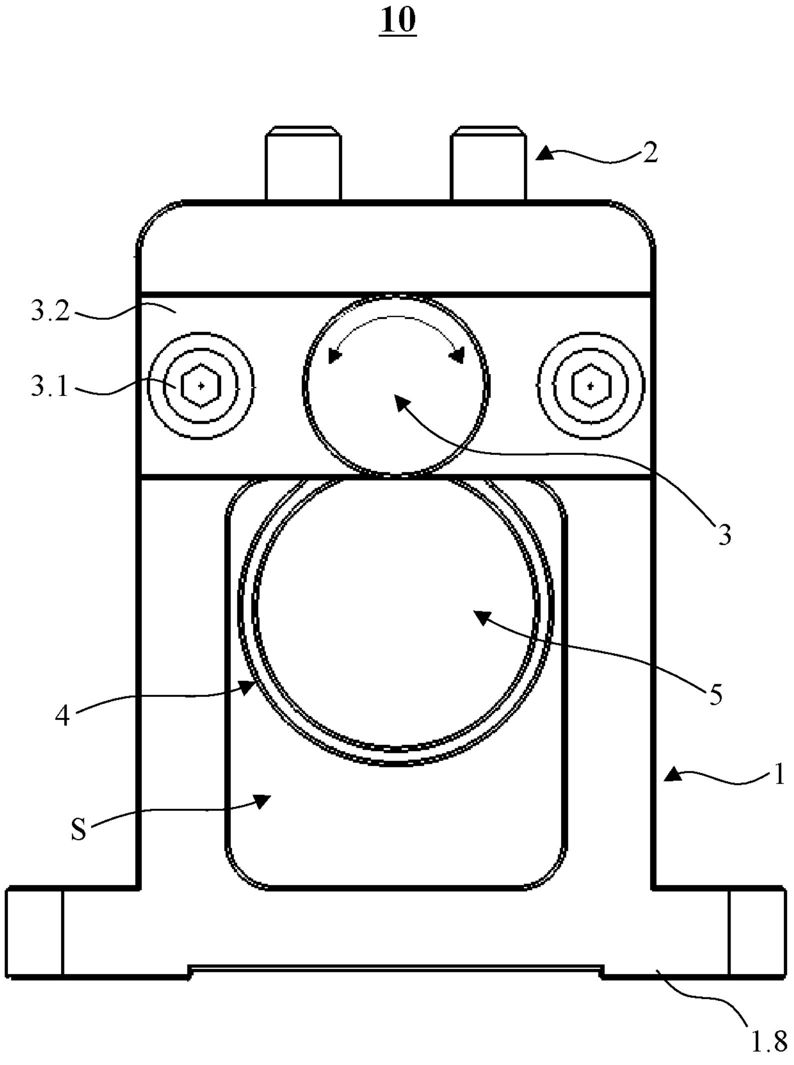
FIG. 4 is a schematic front view of the device in FIG. 1.
Figure 5:
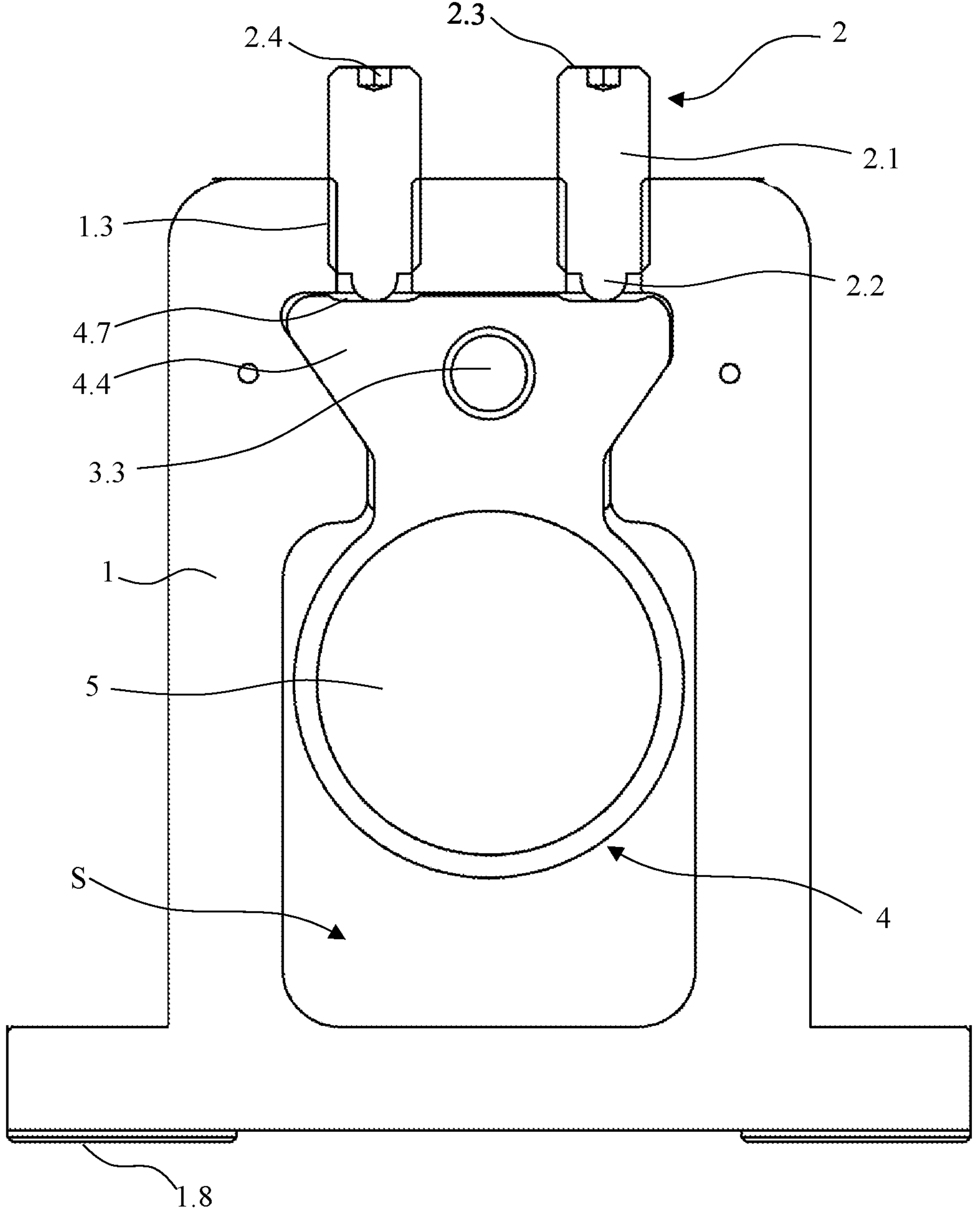
FIG. 5 is a schematic cross-sectional view of the device in FIG. 1, cut along a plane passing through a locking device 2 in the left-right direction.

In addition, the frame 1 may further be provided with a positioning hole 1.7 for precise positioning of the device 10. Since the optical element is mounted on the device 10, the optical element is also precisely positioned correspondingly when the device 10 is precisely positioned. Multiple positioning holes 1.7 may be provided and may have different configurations, as shown in FIG. 3. It will be appreciated that the positioning hole is not limited to the specific examples shown, but may have other forms as long as it can satisfy the precise positioning function described herein.

The frame 1 is further used to support or mount other components of the device 10, including the mount 4 and the adjusting nut 3. The frame 1 has a hollow portion S for accommodating the mount 4 and providing space for the translation of the mount 4. At least part of the hollow portion S matches at least part of the mount 4 in shape to guide the translation of the mount 4.

Figure 2:
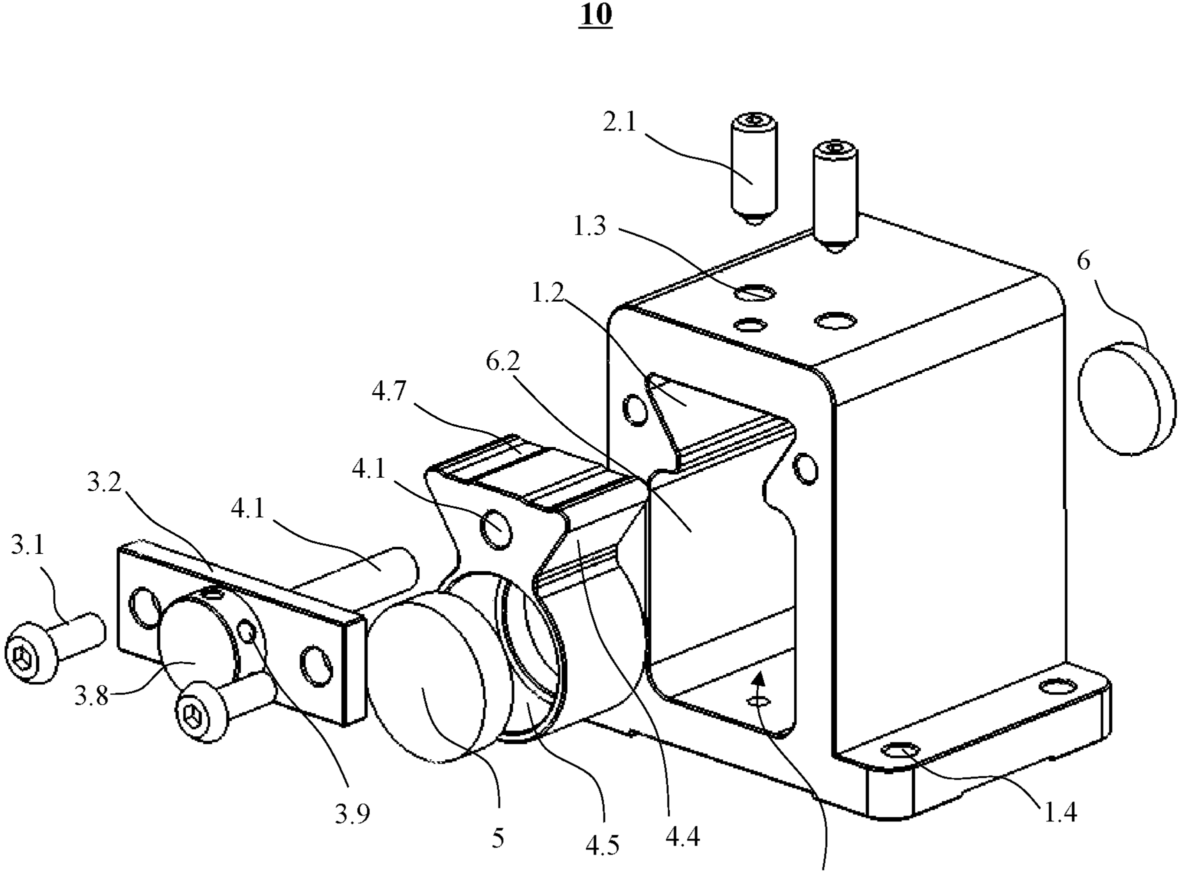
FIG. 2 is an exploded view of the device in FIG. 1.

Referring to FIG. 2, the hollow portion S includes a V-shaped slot 1.2. The V-shaped slot 1.2 extends along a direction of translation of the mount 4. The mount 4 includes a V-shaped portion 4.4. The V-shaped portion 4.4 is fitted in the V-shaped slot 1.2 and is configured to translate in the V-shaped slot 1.2. With the V-shaped structure, the mount 4 can only translate along the V-shaped slot 1.2, and cannot rotate. It will be appreciated that the present disclosure is not limited to the V-shaped structure, but may adopt any other suitable structure that allows the mount 4 to translate but prevents the mount 4 from rotating.

The mount 4 further includes a mounting portion 4.5 for accommodating an optical element 5. The mounting portion 4.5 may be located on a side of the V-shaped portion 4.4 (that is the lower side in the figure). The optical element 5 is fixedly mounted in the mounting portion 4.5. The hollow portion S of the frame 1 may include a slot 6.2 for accommodating the mounting portion 4.5 and providing a space for translation of the mounting portion 4.5. The slot 6.2 may have any suitable shape as long as it does not interfere with the movement of the mounting portion 4.5. In the embodiment shown in the FIGURES, the slot 6.2 has an approximate rectangular cross-section, whereas the mounting portion 4.5 has a cross-section similar to the shape of the optical element 5 (circular in the FIGURES).

The mounting portion 4.5 includes a stepped through hole 4.2. The stepped through hole 4.2 is configured to facilitate the fixation and light transmission of the optical element 5. The stepped through hole 4.2 includes a large-diameter hole and a small-diameter hole with a stepped surface 4.3 formed between the large-diameter hole and the small-diameter hole. The optical element 5 may be fixed to the stepped surface 4.3 by glue or any other suitable means. The large-diameter hole and the small-diameter hole may be coaxial.

Another optical element 6 may further be mounted on the frame 1. The optical element 6 may be arranged at a position of the frame 1 opposite to the optical element 5. Similarly, the frame 1 is provided with a mounting portion 1.9 for mounting and accommodating the optical element 6. The mounting portion 1.9 includes a stepped through hole 1.6. The stepped through hole 1.6 is configured to facilitate the fixation and light transmission of the optical element 6. The stepped through hole 1.6 includes a large-diameter hole and a small-diameter hole with a stepped surface 1.5 formed between the large-diameter hole and the small-diameter hole. The optical element 6 may be fixed to the stepped surface 1.5 by glue or any other suitable means. The large-diameter hole and the small-diameter hole of the stepped through hole 1.6 may be coaxial and may further be coaxial with the stepped through hole 4.2. It will be appreciated that the frame according to the present disclosure may include any other suitable structure suitable for mounting and fixing the optical element, and is not limited to the stepped through holes shown in the FIGURES. The size, shape, etc. of each stepped through hole can vary as required.

The configuration the frame is not limited to the specific example shown in the figures. For example, the frame may be configured to mount only the optical element 5 and allow the optical element 5 to translate, or may be configured to mount more than two optical elements and allow one of the optical elements to translate. The optical elements mounted on the frame 1 can be selected as required. For example, the optical element 5 and the optical element 6 may constitute a beam expander assembly.

A threaded portion 4.1 is further provided on the mount 4 and configured to engage threadedly with the adjusting nut 3. The threaded portion 4.1 may be arranged in the V-shaped portion 4.4. In the embodiment shown in the FIGURES, the threaded portion 4.1 is located approximately at the center of the V-shaped portion 4.4. The adjusting nut 3 includes a screw 3.3 threadedly engaged with the threaded portion 4.1 and a head 3.8 located at an end of the screw 3.3 for operation.

In the embodiment shown in the FIGURES, the threaded portion 4.1 is a threaded hole with an internal thread, and the screw has an external thread engaged with the internal thread. It will be appreciated that the threaded portion 4.1 may have an external thread, and the screw may have an internal thread engaged with the external thread.

The head 3.8 is provided with operational features 3.9 for manipulation by a tool (not shown). In the embodiment shown in the FIGURES, the operational features 3.9 are holes for receiving a tool. The head 3.8 may be provided with multiple holes equally spaced in a circumferential direction. After the tool is inserted into a hole, the tool can be operated to rotate the adjusting nut 3. It will be appreciated that the configurations of the head 3.8 and the operational features 3.9 can vary as required and are not limited to the specific embodiment shown in the FIGURES.

The adjusting nut 3 is attached to the frame 1 in a rotatable but non-translatable manner. The device 10 may include a retaining ring 3.6. The retaining ring 3.6 is configured to allow rotation of the adjusting nut 3 but prevent axial movement of the adjusting nut 3 relative to the frame 1. The screw 3.3 may be provided with an annular groove for receiving the retaining ring 3.6. When the adjusting nut 3 rotates but does not move axially, the rotation of the adjusting nut 3 is converted into the translation of the mount 4 through the engagement between the threaded portion 4.1 and the screw 3.3.

The device 10 may further include a fixing plate 3.2. The fixing plate 3.2 is configured to attach the adjusting nut 3 to the frame 1. The fixing plate 3.2 is fixedly attached to the frame 1 and has a hole 3.5 for receiving the screw 3.3 of the adjusting nut 3. In the embodiment shown in the FIGURES, the fixing plate 3.2 is fixedly attached to the frame 1 by means of fasteners 3.1 such as screws. The structure and manner of attachment of the fixing plate 3.2 can vary as required.

The retaining ring 3.6 is located on a side of the fixing plate 3.2 opposite to the head 3.8 of the adjusting nut 3. The head 3.8 has a size larger than the hole 3.5. The retaining ring 3.6 and the fixing plate 3.2 can cooperate to limit the axial movement of the adjusting nut 3 relative to the frame 1.

It will be appreciated that the structure that allows rotation of the adjusting nut but prevents axial movement of the adjusting nut is not limited to the specific embodiment shown in the FIGURES, but can vary as required, as long as it can achieve the functions described herein.

The device 10 may further include a locking device 2. The locking device 2 is configured to apply a pre-pressure to the mount 4 when the mount 4 translates and to lock the mount 4 relative to the frame 1 when the mount 4 is translated in place. In the embodiment shown in the FIGURES, the device 10 includes two locking devices 2 arranged symmetrically about a plane passing through a central axis of the screw 3.3.

The locking device 2 may include a threaded member 2.1 and a biasing member (not shown). The biasing member is located between the threaded member 2.1 and the mount 4 and is configured to apply a pre-pressure to the mount 4. The V-shaped surfaces of the V-shaped portion 4.4 of the mount 4 abut against the V-shaped surfaces of the V-shaped slot 1.2 of the hollow portion S under the action of the pre-pressure of the biasing member. In this way, the center of the optical element 5 can be further prevented or suppressed from being deviated. The threaded member 2.1 is engaged with the threaded hole 1.3 provided in the frame 1. When the optical element 5 is adjusted in place, the threaded member 2.1 is screwed until the mount 4 is fixed or locked.

The threaded member 2.1 may have a tapered rounded tip 2.2. The mount 4 is provided with a recess 4.7 for receiving the rounded tip 2.2. The recess 4.7 extends in a direction of translation of the mount 4. When the mount 4 translates, the rounded tip 2.2 slides in the recess 4.7. The rounded tip 2.2 facilitates this sliding. The cooperation of the rounded tip 2.2 with the recess 4.7 can guide the translation of the mount 4.

A top surface 2.3 of the threaded member 2.1 may be provided with features 2.4 for manipulation by a tool (not shown). The feature 2.4 can be designed according to the structure of the tool.

Figure 6:
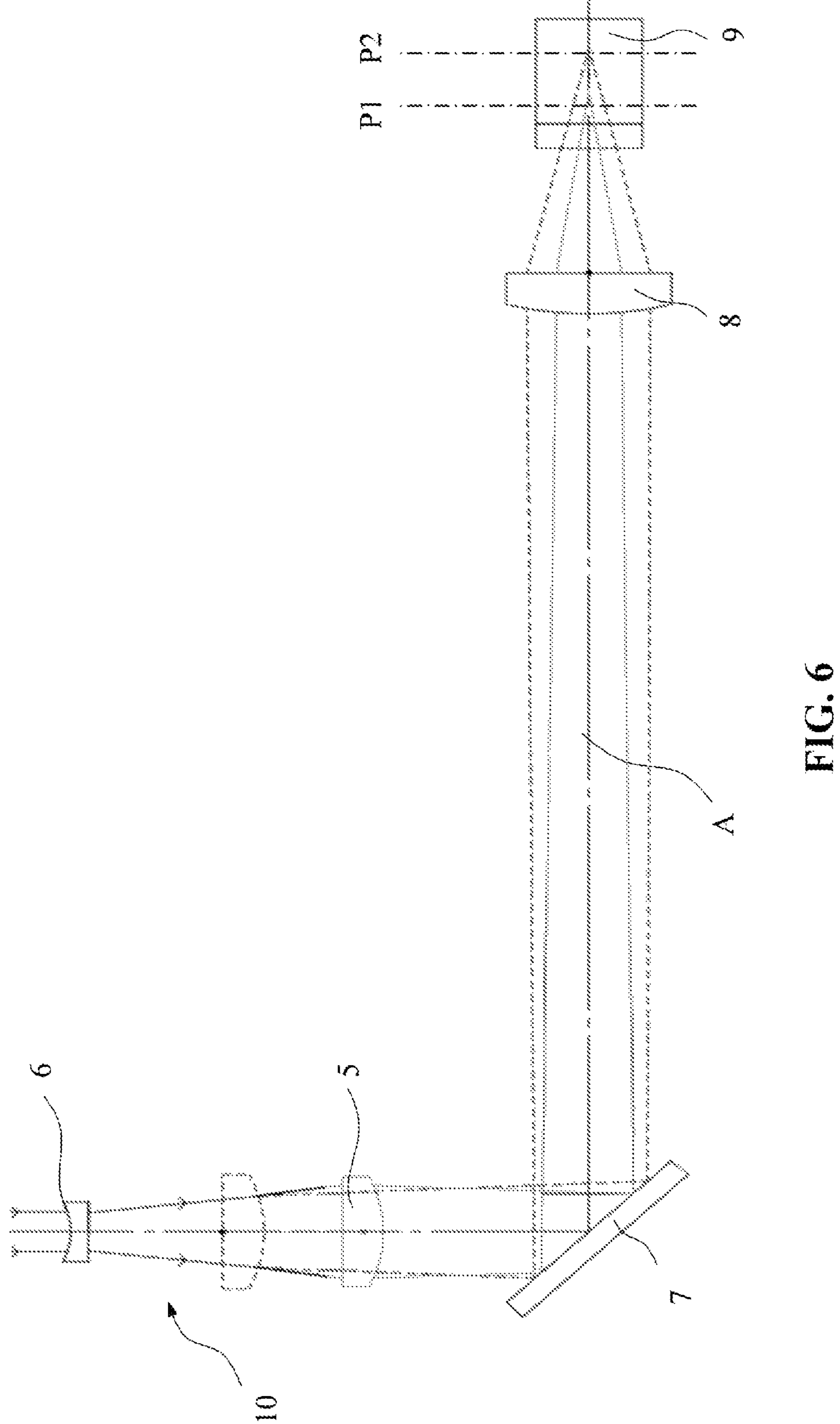
FIG. 6 shows an example of the device according to the present disclosure used as a beam expander in a sample processing instrument.

An example of the device 10 used as a beam expander in a sample processing instrument will be described below with reference to FIG. 6. Referring to FIG. 6, the beam expander includes an optical element 6 in the form of a concave lens and an optical element 5 in the form of a convex lens. The position of the beam waist (focusing point) of the light beam on the optical axis A may be adjusted by adjusting the position of the optical element 5 relative to the optical element 6 in the device 10. When the optical element 5 is in a first position as shown by the solid line, the light beam is focused on a beam waist position P1 in a detection channel 9 via a dichroic mirror 7 and a focusing lens 8. When the optical element 5 is in a second position as shown by the dash line, the light beam is focused on a beam waist position P2 in the detection channel 9 via the dichroic mirror 7 and the focusing lens 8. In FIG. 6, the beam waist position P2 is shifted to the right along the optical axis A relative to the beam waist position P1.

In the sample processing instrument including the device 10, the light beam is focused on particles contained in a sample flowing through the detection channel 9, and the particles emit fluoresce or scattered light when illuminated by the light beam. By collecting the fluorescence or scattered light emitted from the particles, and by processing and analyzing the signals of the fluorescence or scattered light, the information of the detected particles can be obtained. The device 10 can focus the light beam at a desired position to improve detection precision. Furthermore, the sample processing instrument typically includes multiple light sources (lasers), and one device 10 may be provided for each light source. The desired consistency of the focuses of the light beams can be obtained by adjusting the optical element in the device 10.

Although the present application has been described with reference to exemplary embodiments, it should be understood that the present application is not limited to the specific embodiments described and illustrated herein. Without departing from the scope defined by the appended claims, those skilled in the art can make various changes to the exemplary embodiments. Provided that there is no contradiction, the features in the various embodiments can be combined with each other. Alternatively, a certain feature in the embodiment may also be omitted.

What is claimed is:

1. A device for mounting an optical element, wherein the device comprises:

a frame;

a mount fitted in the frame in a translatable but non-rotatable manner and having a mounting portion for accommodating an optical element; and an adjusting nut attached to the frame in a rotatable but non-translatable manner, wherein the adjusting nut has a screw and a head located at an end of the screw for operation, and the mount has a threaded portion engaged threadedly with the screw, such that when the adjusting nut is rotated, the mount translates relative to the frame.

2. The device according to claim 1, wherein the frame has a V-shaped slot, and the mount has a V-shaped portion fitted in the V-shaped slot.

3. The device according to claim 2, wherein the threaded portion is a threaded hole with an internal thread, and the screw has an external thread engaged with the internal thread.

4. The device according to claim 3, wherein the mounting portion is located on a side of the V-shaped portion, and the threaded hole is provided in the V-shaped portion.

5. The device according to claim 1, further comprising a fixing plate and a retaining ring, wherein the fixing plate is fixedly attached to the frame and has a hole for receiving the screw of the adjusting nut, and wherein the retaining ring is located on a side of the fixing plate opposite to the head of the adjusting nut and is configured to limit translation of the adjusting nut relative to the frame.

6. The device according to claim 5, wherein the fixing plate is fixed to the frame via a fastener.

7. The device according to claim 1 further comprising a locking device, wherein the locking device is configured to apply a pre-pressure to the mount when the mount translates and to lock the mount relative to the frame when the mount is in place.

8. The device according to claim 7, wherein the locking device comprises a threaded member and a biasing member, the biasing member is located between the threaded member and the mount, and the threaded member is engaged with a threaded hole in the frame.

9. The device according to claim 8, wherein the threaded member has a tapered rounded tip, the mount is provided with a recess for receiving the rounded tip, and the recess extends in a direction of translation of the mount.

10. The device according to claim 7, wherein the device comprises two locking devices arranged symmetrically about a plane passing through a central axis of the screw.

11. The device according to claim 1, wherein the head of the adjusting nut has operational features for a tool to operate.

12. The device according to claim 1, wherein the mounting portion comprises a first stepped through hole, and the frame is provided with a second stepped through hole for accommodating another optical element, when the mount is fitted into the frame, a central axis of the first stepped through hole coincides with a central axis of the second stepped through hole, and the mount can translate along the central axis of the first stepped through hole.

13. A sample processing instrument comprising the device for mounting an optical element according to claim 1, wherein the optical element is a lens or lens group for adjusting a light source for optical detection or analysis.

* * * * *